UNITED STATES PATENT OFFICE.

JAMES W. FORBES, OF CINCINNATI, OHIO.

MANUFACTURE OF THE EXTRACT OF MALT.

SPECIFICATION forming part of Letters Patent No. 288,702, dated November 20, 1883.

Application filed February 12, 1883. (No specimens.)

*To all whom it may concern:*

Be it known that I, JAMES WINCHELL FORBES, of the city of Cincinnati, in Hamilton county, and State of Ohio, have invented certain new and useful Improvements in the Manufacture of the Extract of Malt, of which the following is a specification.

Before commencing a description of my process I desire to state that when I employ the word "diastatic" as an adjective I refer not only to the single principle known as "diastase," but also to those others present in malted grain that exert a similar action upon starch bodies.

I extract, in the customary and well-known manner, the soluble principles of malted grain by any suitable agent—as, for example, by the use of water alone; but having found that the soluble principles of malted grain, when extracted by water, are unstable and subject to decay and alteration in character, I have invented and applied to their extraction a new agent, which consists of a mixture of alcohol and water, preferably in the proportions of one volume of alcohol and three volumes of water, so regulating the temperature during the time of such extraction as to prevent the action of the diastatic principles (as above defined) upon the starch which they are associated with in the grain. The process of extraction may be either by the method known as "percolation" or by the maceration of the grain with the liquid, and subsequent expression. The resulting liquid I then clarify by rest or filtration to obtain a product containing in an unchanged chemical condition and free from starchy bodies the diastatic principles as previously defined. The temperature during the period of extraction and elimination of starchy substances must be kept below that at which the action of diastatic principles is promoted to avoid the expenditure of convertive power, such expenditure being the basis of the processes heretofore followed for the preparation of extract of malt, such temperature being, for the purpose of this invention, considered as that included between 100° Fahrenheit and 150°. A solution of the diastatic principles of malted grain in an unchanged chemical condition and isolated from starchy bodies being thus obtained of unknown quantitative value as regards convertive influence upon starch, the value of such solution as regards ability to perform work I now determine by the amount of such work that a known quantity will actually perform in the conversion of starchy matter into the soluble bodies known as "sugar," "dextrine," and their congeners under the conditions customary with and well known to chemists as favorable to and promotive of such conversion. I then adjust the volume or weight of said solution (by evaporation at a temperature below 100° Fahrenheit when too weak, or by dilution with a liquid of the same nature as originally used when too strong) to an arbitrarily-chosen standard, such standard being expressed in definite and positive terms as the weight of starch that a given weight or volume of the solution obtained, as hereinbefore stated, will so convert. I thus, in the place of the vague and indefinite character as regards digestive action inherent in extracts of malt as obtained by the processes heretofore followed in their preparation, confer one of an absolutely positive nature, combining the essentials of definite, constant, and prearranged value as regards power in inducing the conversion of starch into dextrine, sugar, and their congeners, such conversion being the measure of the digestive action of the substances known as "extracts of malt."

My invention thus consists of three principal features. First, the treatment of the malted grain with an alcoholic liquid, whereby danger of irregular action or fermentation is obviated, and increased solvent action upon the diastatic principles is obtained by the softening of the resinous and fatty matters contained in the grain; second, the observance of certain conditions of temperature for the prevention of the action of the diastatic principles upon the starch with which they are associated in malted grain during the process of their isolation from such starch, such conditions being directly the reverse of those heretofore observed; third, a product possessing a definite and quantitatively expressible capacity for work in the conversion of starchy bodies into the soluble substances known as "sugar," "dextrine," and their congeners, this capacity for work being due to the presence of free, active, diastatic principles and the definite character of the product to its adjustment to a predetermined standard of convertive power.

The merit of this invention consists, in general, of the following most important improvements, which I will show by the subjoined comparison between the extract of malt as heretofore prepared and the product of which I claim to be the inventor.

Warm water is used in the treatment of the grain, the action of diastatic principles is promoted with expenditure of convertive power upon the starch associated with them in the grain, furnishing a solution requiring immediate concentration to avoid fermentative action, giving as a final product a molasses-like body containing and being mostly composed of substances obtained by the action of diastatic principles upon starch, constituting a rich food containing, under the most favorable circumstances, a vague and variable quantity of diastatic principles, and exerting but little convertive action upon starch.

An agent is used for the extraction of the soluble principles of the malt that exercises at all times a preservative influence, and, under conditions that prevent any expenditure of the power of the diastatic elements of the malt, furnishing a product not subject to change spontaneously, and which by treatment in the manner prescribed gives as a final result a limpid fluid, absolutely permanent under all ordinary conditions, containing but a trace of those bodies resulting from the action of diastatic principles upon starchy bodies known as "dextrine," "sugar," and their congeners, and whose absolute value as a converting agent of starch into such substances is definite, constant, and prearranged with reference to the amount of such convertive work, that it will actually perform the bulk or value of the malt used in its preparation, not being considered as a factor in the estimation of or adjustment to the prearranged standard of value.

What I claim as new and of my invention, and desire to secure by Letters Patent, is—

1. The treatment of malted grain according to the well-known and customary rules of either of the processes termed "displacement" or "maceration with expression" with a mixture of alcohol and water at a temperature not exceeding 100° Fahrenheit to obtain a permanent solution of the soluble principles of malted grain in a condition as they exist normally in such grain, and practically free from secondary products derived from interaction of the starchy diastatic constituents.

2. The treatment of malted grain according to the well-known and customary rules of either of the processes termed "displacement" or "maceration with expression" with water containing not less than eighteen nor more than forty per cent. of real alcohol at a temperature not exceeding 100° Fahrenheit to obtain a permanent solution of the soluble principles of malted grain in a condition as they exist normally in such grain, and practically free from secondary products derived from interaction of the starchy and diastatic constituents.

JAMES WINCHELL FORBES.

Witnesses:
W. W. CHAMBERLIN,
J. WM. STREHLI.